United States Patent [19]

Ducharme

[11] Patent Number: 5,452,031

[45] Date of Patent: Sep. 19, 1995

[54] CONTACT LENS AND A METHOD FOR MANUFACTURING CONTACT LENS

[75] Inventor: Christopher A. Ducharme, Newton, Mass.

[73] Assignee: Boston Eye Technology, Inc., Chestnut Hill, Mass.

[21] Appl. No.: 65,388

[22] Filed: May 21, 1993

Related U.S. Application Data

[63] Continuation of Ser. No. 58,882, May 5, 1993, abandoned.

[51] Int. Cl.$^6$ .............. G02C 7/04; B24B 51/00
[52] U.S. Cl. .................. 351/177; 351/160 R; 451/64
[58] Field of Search ............ 351/160 R, 160 H, 161, 351/162, 177; 51/165.71

[56] References Cited

U.S. PATENT DOCUMENTS 4,976,534 12/1990 Miege et al. ............... 351/161
4,980,993 1/1991 Umezaki ................... 51/165.71

*Primary Examiner*—Scott J. Sugarman
*Attorney, Agent, or Firm*—Fish & Richardson

[57] ABSTRACT

A contact lens having a smooth surface is made through use of a computer implementing a spline approximation of corneal topology. Piecewise polynomials approximating the corneal topology have equal first and second derivatives where they join. A curve representing the central optical portion of the lens and the piecewise polynomial adjacent to the central optical portion curve have an equal first derivative where they join. A contact lens is cut corresponding to the smooth surface defined by the piecewise polynomials.

12 Claims, 7 Drawing Sheets

Microfiche Appendix Included
(1 Microfiche, 64 Pages)

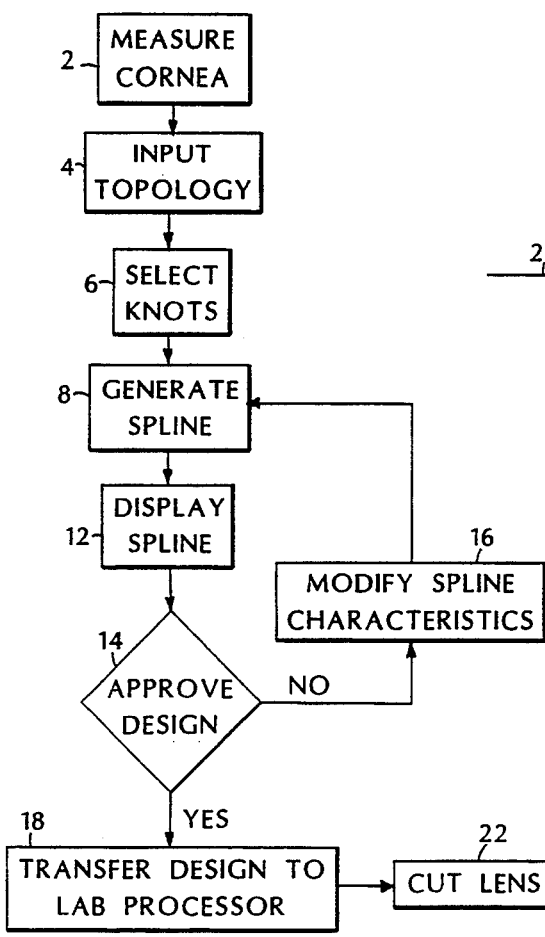
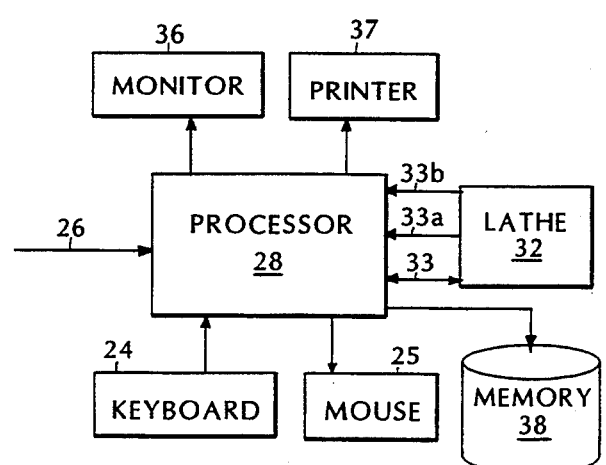
FIG. 1
FIG. 2

CONTACT LENS AND A METHOD FOR MANUFACTURING CONTACT LENS

CROSS REFERENCES TO RELATED APPLICATION

This application is a continuation of U.S. patent application Ser. No. 08/058,882, filed May 5, 1993, now abandoned.

BACKGROUND OF THE INVENTION

The present invention relates generally to contact lens design, and in particular to a method for defining a contact lens surface.

The surface topographies of normal human corneas are not spherical. Instead, their surfaces flatten at varying and unpredictable rates from the center of the cornea to the periphery. The fit of contact lenses that rest entirely on the cornea must take this corneal shape factor into account. For example, the tolerance of rigid contact lenses is largely dependent on their ability to slide over the cornea in a vertical motion with each blink. This provides a mechanism of pumping fresh tears under the lens that brings with it oxygen and flushes away accumulated debris and waste products. It is well known that if a spherical rigid contact lens is placed on a cornea, any movement would cause the edge of the lens to dig into the flatter surface of the peripheral cornea. This would curtail lens movement and traumatize the cornea. To avoid this problem, the peripheral surfaces of rigid contact lenses are made flatter than their centers so that they form a ski-like relationship with the cornea, for reasons including, for example, the flushing of accumulated debris and waste products. While the lens design must provide sufficient edge clearance, at the same time the thickness of the lens edge must permit the eye lid to slide over the lens without irritation to the eye lid surface. It is desirable that a rigid lens slide over the cornea in a vertical motion with each blink of the eye. Lens position relative to the cornea and the amount and consistency of blink-induced lens movement are also considered for the wearer's comfort.

An essential characteristic of the lens design is the creation of a space between the edge of the lens and the underlying cornea, known as edge clearance or edge lift. Although it must be sufficient to keep the edge of the lens above the surface of the cornea during lens movement, the edge clearance should also be as small as possible to avoid irritating the edge of the upper lid so it slides over the edge of the lens during the closing phase of a blink. As the lens shifts position on the eye during the blinking process, the edge clearance acts as a scoop to bring a fresh supply of tear fluid under the lens and alleviate the problem of oxygen depletion. A lens made of gas permeable plastics, which allow direct transfer of oxygen through the material itself, also assists in this process but some form of edge lift is still desirable. As a result, the precise amount of edge lift can be critical in determining the wearing comfort of a rigid contact lenses.

Other factors important to rigid contact lens wearing comfort are the amount and consistency of blink-induced lens movement and lens position since a lens that positions higher on the cornea will be more comfortable than one that positions low. Both of these lens fitting characteristics are influenced by the width and shape of the peripheral contact lens fitting zone which, ideally, should be tailored to the topography of the individual peripheral cornea.

The typical approach to creating a flatter peripheral lens surface and adequate edge clearance has been to generate a series of conic section curves, each having a radius of curvature larger (flatter) than the preceding one. If these curves are spherical, they will create sharp junctions where they join and these junctions must be removed by hand polishing to avoid irritating the cornea. The method has serious limitations. The blending of the curves is subject to human judgment and operator skill, and it may be incomplete resulting in contact lens wearing discomfort or it may be excessive and thereby create a different unpredictable surface shape. The result is a lack of reproduce ability and precision when fabricating the peripheral surface of rigid contact lenses.

Another method of designing a junctionless posterior contact lens surface is to choose a series of progressively flatter conic section curves, such as ellipses, that join tangentially. However, the requirement of tangential joining greatly limits the choice of curves and such curves lack the flexibility of being configured to have a precise relationship to a specific corneal shape.

Thus, when a contact lens is placed onto the cornea, a peripheral portion of the back surface of the lens makes primary contact with the eye. The central optical portion of the contact lens generally vaults the central cornea and is supported by the periphery.

Another aspect of lens design is the central portion of a lens that provides the optics. The central portion is generally described by a conic section (usually a sphere or ellipse). Any other type of optical surface has been very difficult and costly to manufacture, although using computer controlled manufacturing equipment, optical surfaces may deviate from the traditional regular conic. An object of this invention is lens manufacture using the advantages of computer controlled manufacturing equipment whether or not the central portion is described by a conic section. Another object of the invention is to manufacture the front and back surfaces of the lens without creating any junctions that require human polishing or blending.

An object of this invention is a novel method to efficiently manufacture a smooth and reproducible lens surface that fits the cornea. Accordingly, another object of the invention is to permit the fitter control over the shape and magnitude of edge clearance, particularly axial edge clearance.

SUMMARY OF THE INVENTION

The invention relates to a method for defining the shape of a contact lens surface by relating the surface to a reference curve. The reference curve may be derived from point coordinates representing measurements of a specific corneal surface topography or it may represent a hypothetical (model) corneal shape. Using the inventive method, the surface shape of a contact lens can be defined by a series of point coordinates (knots) that have a specific clearance value relative to the reference curve. Using splines, the invention joins all of the knots with a smooth, junctionless curve. In this manner, the back surface shape of a contact lens can be designed so as to have any desired relationship with a real or model corneal shape including that of the periphery of the cornea.

Another feature of this invention allows the back surface shape of the lens to represent the reference curve for designing its front surface. In this manner any part, or all, of the front surface of a contact lens can be constructed to have a specific relationship with its back surface. This is useful in correcting optical aberrations introduced by the back surface of the lens of the eye, in optimizing the mass of the lens by controlling its thickness from center to edge and in creating any desired cross section configurations to optimize its fitting characteristics. Using splines, both contact lens surfaces created by this invention are junctionless and therefore do not require alteration by hand polishing which facilitates exact reproduce ability.

The method of this invention can thus be utilized to create the front and back surface of the extreme periphery of the lens, to design an optimal edge shape, and to create a defined and reproducible edge clearance.

This invention can be applied to the design and fabrication of soft contact lenses and rigid scleral lenses which fit over the sclera (the white part of the eye).

The invention features a user interface that permits the fitter to view a proposed lens surface shape superimposed over that of the corneal model and to alter the shape in a predictable, controlled fashion by manipulating any of the knots (control points) along their X and/or Y axes. The modified curve will pass through the changed coordinates smoothly. The data defining the surfaces of the contact lens can be stored as a specific file in a computer memory for future use or can provide instant and exact reproduction through its link to the host program of a computerized contact lens manufacturing machine.

Thus, the invention relates a method for defining a contact lens having a smooth surface along the lens periphery where the lens may be in contact with the cornea, and features, in particular, where a peripheral portion of the back lens surface has a series of piecewise polynomials joined end to end, the piecewise polynomials having equal first and second derivatives where they join. In another aspect, the piecewise polynomials are determined so that the curve approximating the optical portion of the lens and the adjacent piecewise polynomial have an equal first derivative where they join. The resulting smooth lens surface, according to the invention, eliminates or greatly reduces the probability of patient discomfort or corneal insult.

The invention features, in one aspect, fashioning a lens having a smooth posterior peripheral edge through the use of a computer implementation of approximation techniques including splines.

The invention also features a user interface permitting the fitter to view a lens design and to modify the design through manipulation of edge clearance or other lens characteristics. According to the invention, patient discomfort resulting from a lens is advantageously reduced while permitting precise reproduction of the lens to maintain dimensional consistency.

BRIEF DESCRIPTION OF THE DRAWING

Other objects, features, and advantages of the invention will be apparent from the following description taken together with the following drawings:

FIG. 1 is a flow chart of steps in lens manufacturing in accordance with a particular embodiment of the invention.

FIG. 2 is a block diagram of a system employing the invention.

DESCRIPTION OF PARTICULAR PREFERRED EMBODIMENTS

Figures 3, 4:
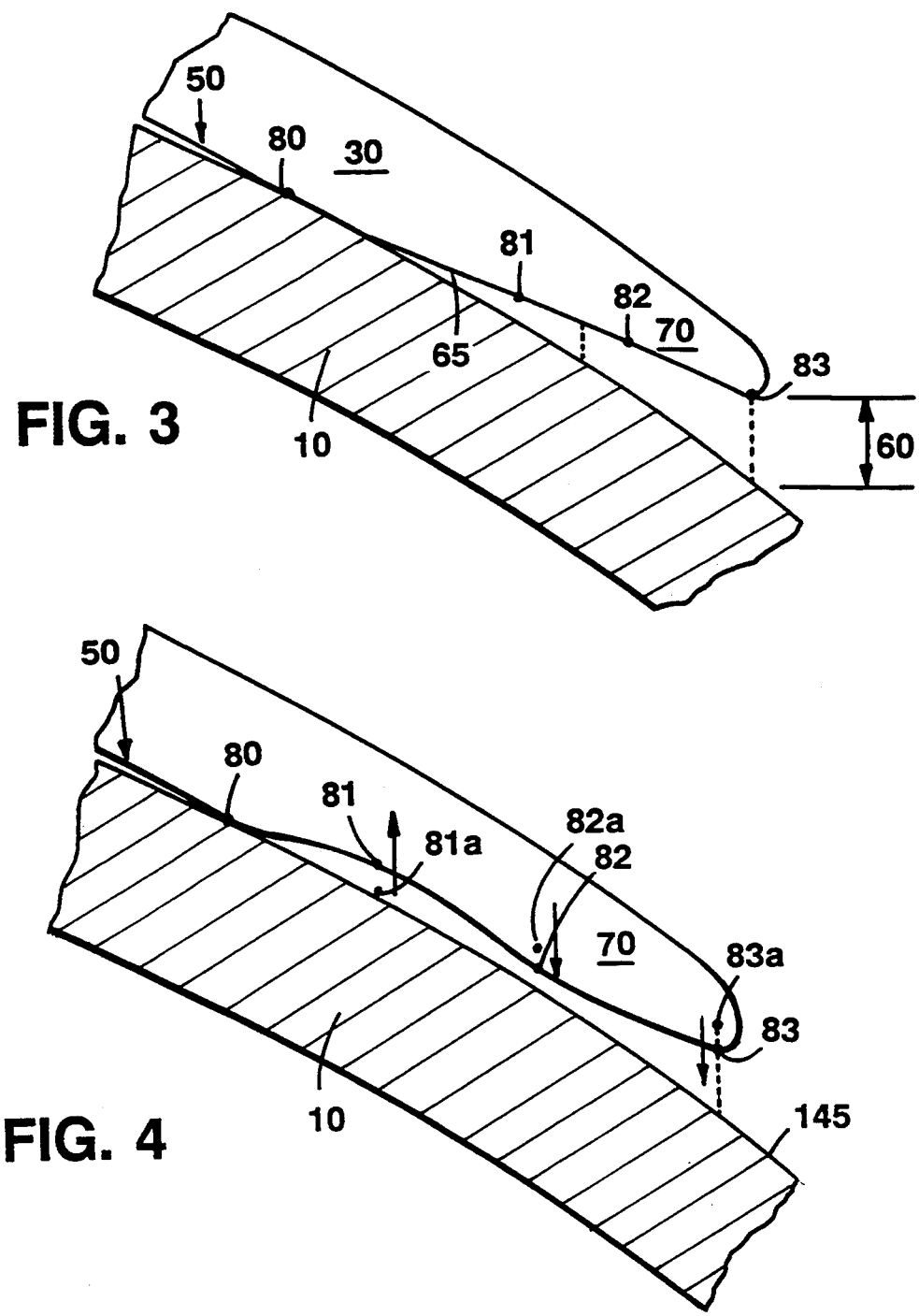
FIG. 3 is a magnified cross-sectional view of a lens having a posterior spline curve periphery in accordance with the invention.
FIG. 4 is a magnified cross-sectional view of a lens having a spline curve periphery in accordance with the invention.

Referring to FIG. 2, in a typical operating environment, a system for manufacturing a contact lens in accordance with the illustrated embodiment of the invention has a central processing unit 28, appropriately programmed, to operate a computer controlled lathe 32. The processing unit 28 has typical peripheral elements such as a keyboard 24, a mouse 25, a monitor 36, a printer 37, and a memory unit 38. The processor 28 can also receive data according to one aspect of the invention from other, potentially remote, sites over a line 26.

In a typical operation of the apparatus of FIG. 2, and referring to FIG. 1, a contact lens specialist can measure, or estimate, the corneal surface topography at 2 and input that topography at 4 to the computer system. Other data useful to define a lens may also be input, such as a clinically desirable axial edge clearance, or other clinical or optical constraints. The computer system then generates an approximation to the corneal surface topography, in a manner to be described in more detail below, but using a spline curve fitting approximation, at 6, 8. The result of the curve approximation, representing a lens design, can be displayed to the user, preferably in an interactive session, at 12. If the user finds the resulting curve fit acceptable, then the lens design is approved at 14 and can be transferred to the lab processor at 18 to cut the lens at 22. If the curve fit is not acceptable, for example because it fails to provide proper edge clearance, or makes substantially excess contact with the cornea, or for a number of other clinical reasons, the user in an interactive session using the keyboard, mouse, and monitor can provide for an alteration of the computer generated curve and thereafter generate a new curve to fit the now refined and changed input data to improve the approximation of the refined corneal topography. Such modifications are made at 16, and the steps of input, approximation, display, and refinement, if necessary, can be repeated. Once the design has been approved, the data is transferred, at 18, and the lens is cut, at 22.

The lens design procedure is applicable both to large scleral lenses as well as to smaller contact lenses. Also the lens design procedure applies to both rigid and soft lenses. The invention provides the fitter with significantly improved flexibility in designing the lens, as described in greater detail below. The result is a lens with a consistent reproducible fit.

Figure 12:
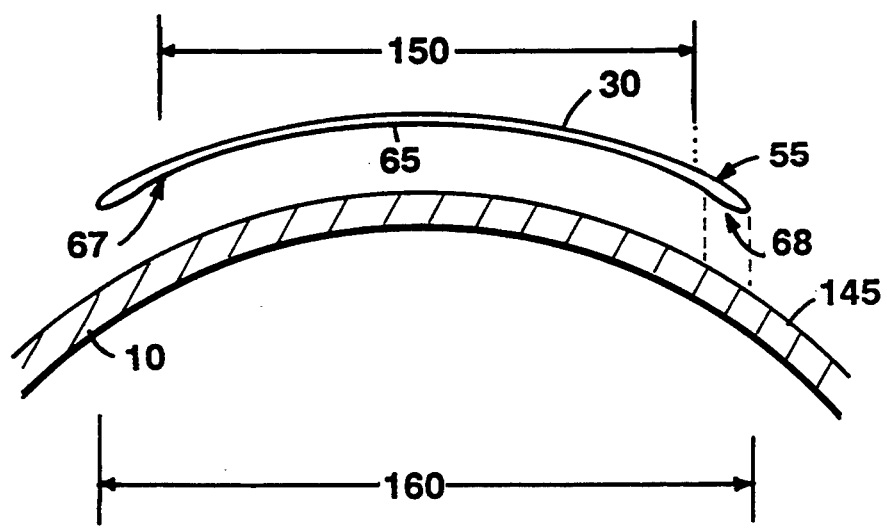
FIG. 12 is a cross-sectional view of a lens having front and back spline surfaces in accordance with the invention.

A lens 30, referring to the FIG. 12 showing the lens cross section in its entirety, generally has a central optical portion spanning an area 150 and has a front surface 55 and a back surface 65. The back surface, referring to the lens periphery shown in FIG. 3, has a central optical portion 50 joining a peripheral portion 70 at a point 80. A curve defining the periphery 70 of the back lens surface is constructed, in accordance with a preferred embodiment of the invention, by placing a number of discrete points 81, 82, and 83, known as knots, (more or less points can be used in other embodiments) to identify points along a curve to be generated which curve represents the back surface of the lens to be made, and then generating a spline fitting the knots. According to the invention, a spline curve is the preferred approximation method. This method is discussed in detail in deBoor, *Springer Verlag*, "A Practical Guide to Splines" (1978), the contents of which are incorporated herein by reference, particularly, but without limitation, page 55.

The junctions of the curve radii used to traditionally define a lens may be selected as knots, or knots may be chosen to maintain a desired edge clearance, such as an axial edge clearance 60 from the cornea 10 shown on FIG. 3, or to provide a desired edge clearance shape. Knots may also be chosen with reference to an actual or model corneal shape, and to provide any desired relationship with the actual or model cornea.

Referring to FIG. 4, knot 80 is maintained, while knots 81, 82, 83 have been moved, under the operator's control, relative to the original location of the knots (represented by 81a, 82a, and 83a respectively), to achieve a desired new back surface having a favorable wear characteristic relative to a surface 145 of the cornea 10, enabling lens clearance characteristics and design constructs to be limited only by physical lathing constraints. The computer controlled lathe 32, referring to the system shown in FIG. 2, receives the spline data over line 33 and generates a signal 33a indicating the necessary lens form to be cut. A message or signal 33b may be generated if and when a lens corresponding to the output spline is cut, or when physical lathing constraints must be further considered.

Figure 5:
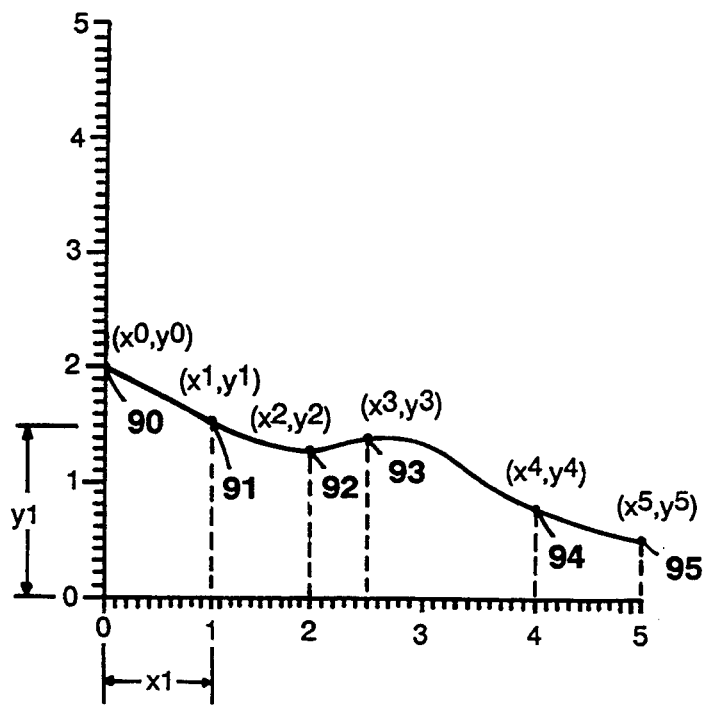
FIG. 5 is a graph of knot placement.

Referring to FIG. 5, knots 90, 91, 92, 93, 94, and are shown on the curve to be constructed. Each knot is defined by an x (abscissa) component and a y (ordinate) component, (x0, y0) corresponding to knot 90, (x1, y1) corresponding to knot 91, and so on.

A spline according to the invention, fitting all the knots, may be defined by the following rules.

1. There will be a piecewise polynomial fit between every two adjacent knots. Thus, if there are n number of knots, there will be n-1 equations. Although a cubic polynomial is generally used, this is not an absolute criterion and any degree equation may be employed. A cubic is, however, the minimum degree equation that will fulfill both the third and fourth requirements stated below.

2. At all internal knots the two curves described by the equations on either side will each pass exactly through that knot.

3. Where any two equations join they will have exactly the same slope. That is, they will have the same first derivative:

$$f1'(x) = f2'(x)$$

Figure 6:
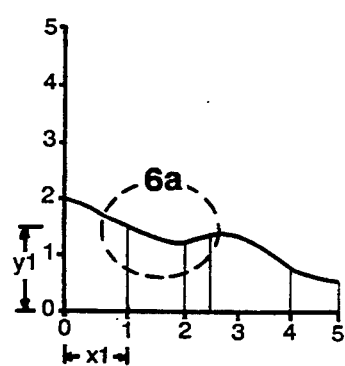
FIG. 6 is an exploded view of a graph of a spline.

Referring to FIG. 6 this property is shown graphically. Equation 0 is the equation between knot 90 and knot 91, equation 1 is the equation between knot 91 and knot 92, and so on. Angle 101, which is the tangent angle of equation 0 at knot 91, will be also the tangent angle of equation 1 at knot 91. Angle 102 is the tangent angle of equations 1 and 2 at knot 92.

4. Where any two equations join they will have exactly the same rate of curvature. That is, they will have the same second derivative:

$$f1''(x) = f2''(x)$$

The result will be a continuous curve which consists of a series of smaller curves all joined smoothly end to end.

The basic definition of a spline encompasses only how the controlling equations will behave between the knots. This leaves open the question of what behavior is expected before knot 90 and after the last knot (knot 95 in the embodiment illustrated in FIG. 5). A spline where these behaviors are left undefined is generally referred to as a "free" or "natural" spline. This most common spline form is usually described in engineering textbooks or employed in CAD (Computer Assisted Design) software packages. It makes no assumptions about the boundary conditions, i.e., restrictions placed on the end points.

Figure 7:
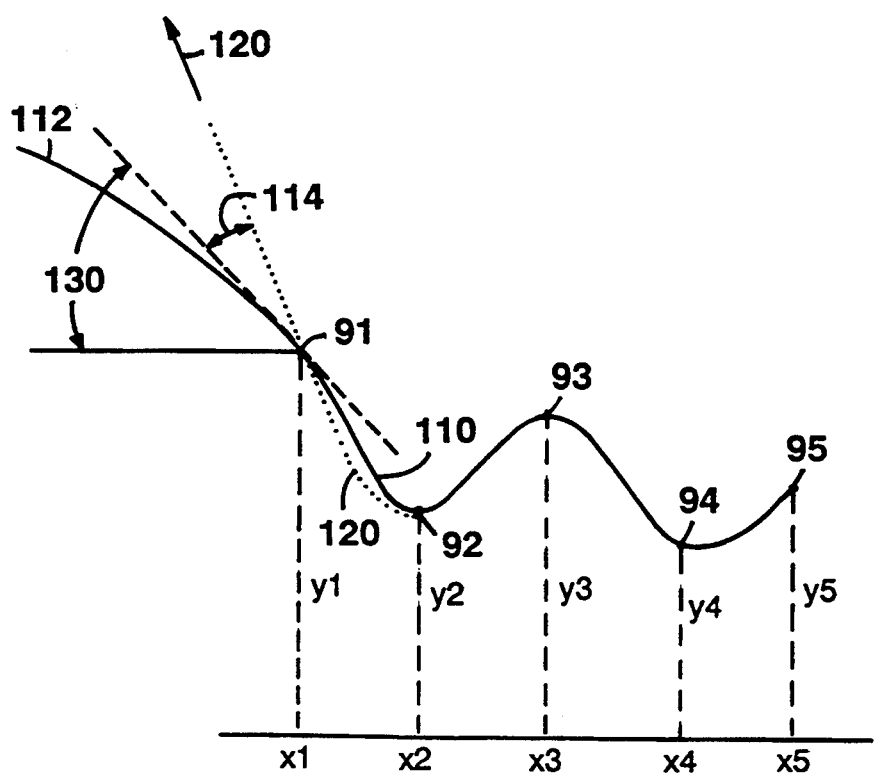
FIG. 7 is a graph of a free spline and a clamped spline.

In a preferred embodiment of the invention, the spline is used as a tangential extension to some other geometric construct, that is the curve defining the back surface 65 of the central portion 50 of the lens 30 (FIG. 3). When provided the initial knot position (knot 80 in the illustrated embodiment of FIG. 3), and also an initial slope at the initial knot position, a spline is computed so that the transition between the curve defining the central optical portion 50 and the curve defining the lens periphery 70 is smooth and continuous. When boundary conditions are provided, the spline is usually referred to as a "clamped" spline. Referring to FIG. 7, the difference between using a free and a clamped spline is shown at knot 91. At knot 91 a clamped spline 110 is a smooth extension of a base curve 112 whereas a free spline 120 forms a pronounced angle 114 to the base curve even though the initial knot position remains the same. At the edge end, where knot 95 is located, where the exiting angle is of less importance, and a "not-a-knot" condition is employed; that is, there is no constraint on the first or second derivative of equation 4 at knot 95.

Figure 8:
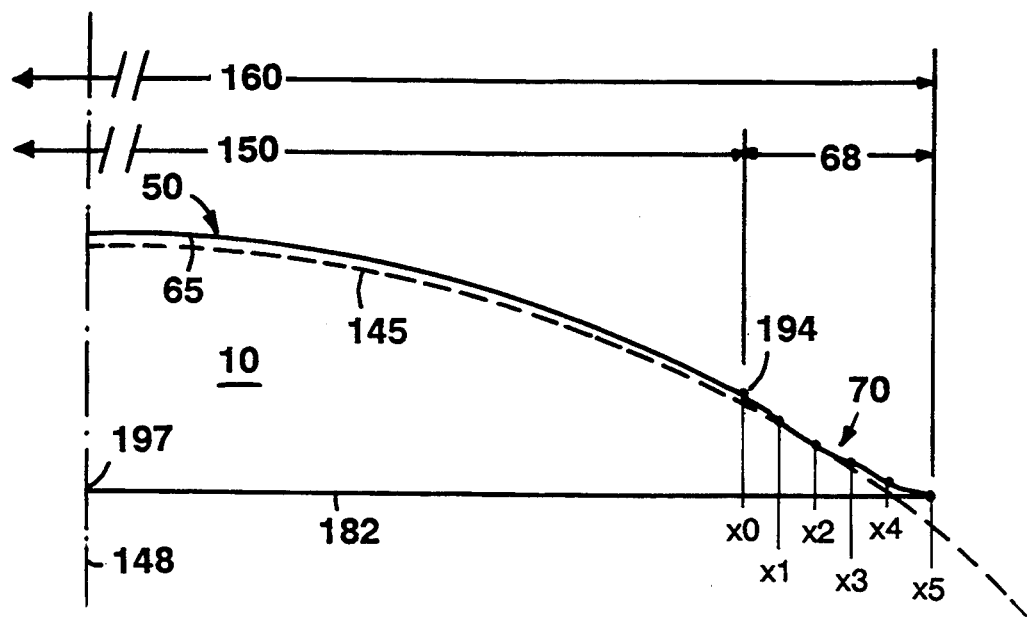
FIG. 8 is a magnified cross-sectional view of a lens posterior surface having a clamped spline curve periphery in accordance with a particular embodiment of the invention.
Figure 9:
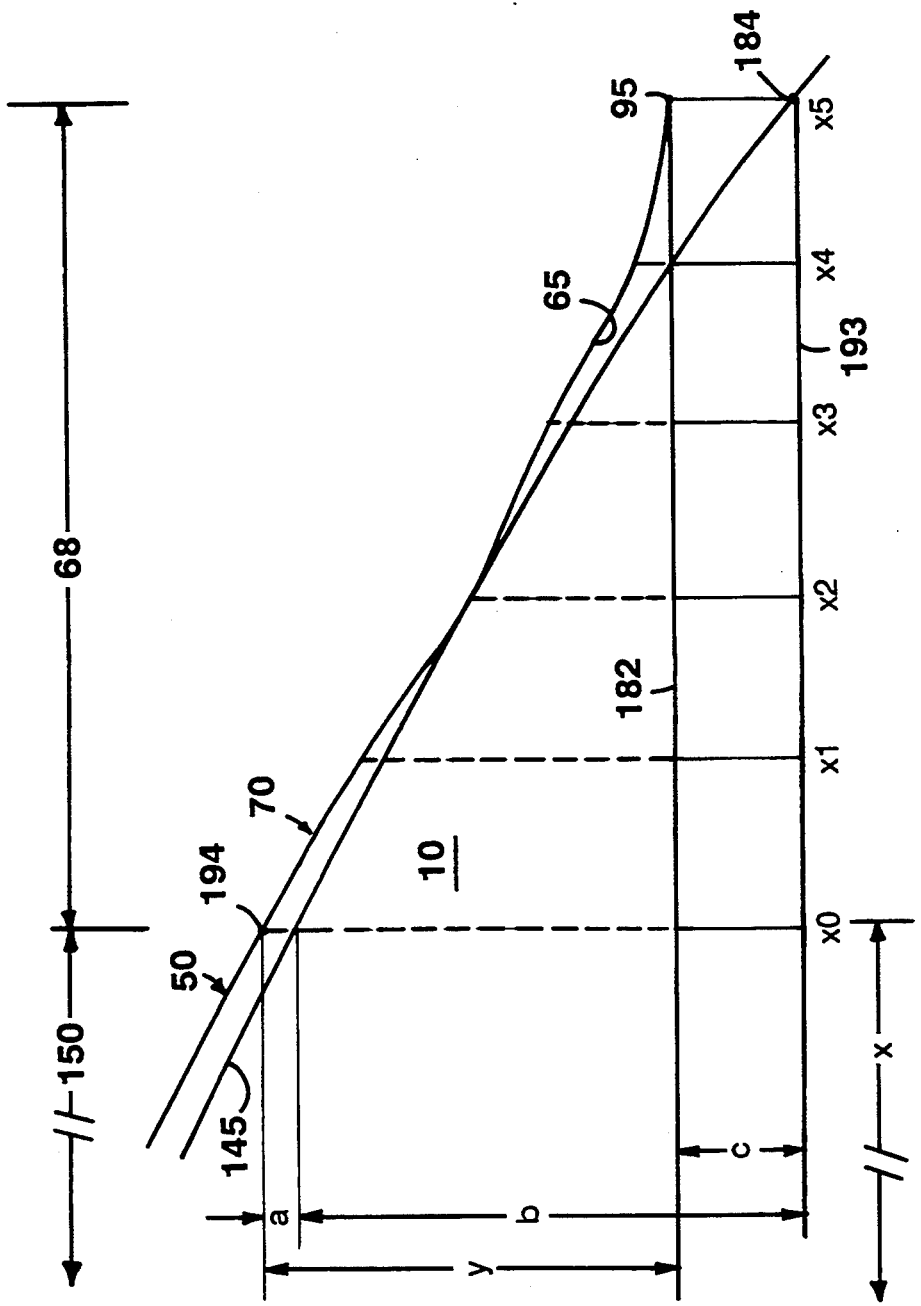
FIG. 9 is an exploded cross-sectional view of a lens posterior surface having a clamped spline curve periphery in accordance with a particular embodiment of the invention.

Referring to FIGS. 8 and 9, in the embodiment shown, the lens has a clamped spline curve periphery. In FIG. 8 a portion of the area 160 spanned by the lens is shown, and includes a peripheral portion 68 that abuts the area 150 spanned by the optical portion of lens. The lens back surface 65 is made of a curve defining the central optical portion 50 that joins the curve defining the peripheral portion 70 at a point 194. A center axis 148 of the lens is shown perpendicular to a base chord 182 at a point 197.

Referring to FIG. 9, an exploded view of the periphery of the lens back surface 65, the x and y coordinate values for each knot are determined. For each consecutive knot, the x abscissa value (x0, x1, x2, x3 . . . ) represents the horizontal distance from the center axis 148 to that knot. A base chord 182 is perpendicular to center axis 148 and intersects the last knot 95. The y value is the height of the knot as measured from the base chord 182 of the lens. The y value is also called the sag of the lens at a given x abscissa value.

The point 194, where periphery 70 and optical portion 50 join in the embodiments illustrated in FIGS. 8 and 9, has the abscissa value x0 determining the first knot and the starting point for the spline. All subsequent knots will be further from the center axis 148 than x0. The actual distance of x0 from the center axis may be determined by the fitter based upon the desired dimension of either the lens optical portion 150 or the peripheral portion 68.

Referring to FIG. 9, the axial edge clearance is determined by the distance between the base chord 182 and the line 193. The line 193 intersects the corneal surface 145 at a point 184, where the distance from the center axis 148 to the corneal surface equals a value of x5, the abscissa coordinate of the last knot, 95. At each x abscissa value it is also necessary to know the height (sag) of the cornea. This can be either calculated based on the model of the cornea (sphere, conic section, etc.) chosen by the fitter and using typical keratoscope measurements of central and peripheral corneal radius, or, in an enhanced system, by actual corneal topographic mapping information. The y height of the spline at the given x abscissa coordinate value, and thus the sag of the lens at that point can then be calculated by adding the desired clearance to the corneal height and subtracting the axial edge clearance. Referring to FIG. 9, the y coordinate value of each spline knot is equal to the sag of lens at the particular knot abscissa x and is determined by three values: the desired clearance a between the corneal surface 145 and lens surface 65, the height b of the cornea at abscissa x, the axial edge clearance c, and is calculated as $$y = a + b - c$$

The result will be a series of x, y coordinate points established, referring to FIG. 8, relative to the point 197 located at the intersection of the base chord 182 of the lens and the central axis 148. These are the spline knots and from these the shape of the spline, and thus the shape of the lens back surface periphery is established.

In a preferred embodiment, the actual computation of the coefficients for each equation is accomplished using a computer software program detailed below, Referring to FIG. 2, output data representing the spline or a graph of the spline may be printed by the printer 37, displayed on the monitor 36 or may be transferred to the computer controlled lathe 32 for cutting a lens corresponding to the spline. A programmed computer 28 may generate a graphic computer representation of the spline, advantageously presenting the spline, the spline knots, and the approximated corneal topography on the monitor 36, or on a printout generated by printer 37. The fitter viewing the graphic computer representation, based on contact lens fitting experience or clinical observations, may graphically and/or mathematically, through the keyboard 24 or the mouse 25 may alter the design of the lens as deemed necessary, for example, by moving the spline knots or specifying a desired axial edge clearance. Providing a user interface for use in a preferred embodiment of the invention has yet further advantages.

The processor 28 receiving one of the messages 33a, 33b from the lathe 32 may in turn generate an appropriate message, for example, for display on the monitor 36. The lens designer may thus, advantageously, be given an indication of physical lathing constraints.

Figure 10:
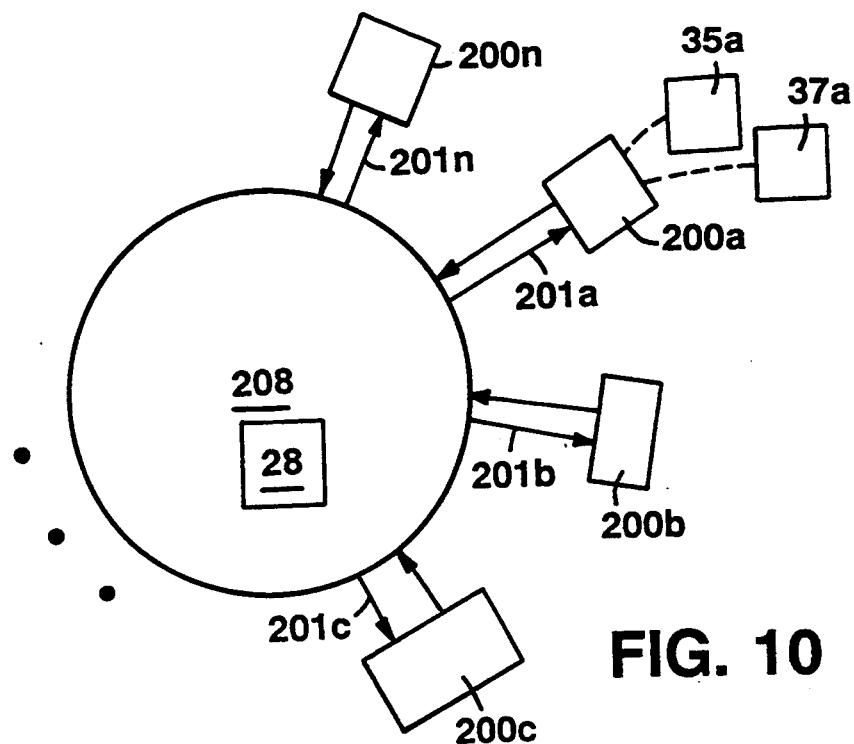
FIG. 10 is a block diagram of a networked system employing the invention.

In a particular preferred embodiment of the invention, referring to FIG. 10, a patient's cornea is measured at a fitter's office 200a connected by a telephone line 201a to the computer processor 28 at the manufacturing site 208, as are a number of other fitter's offices 200b, 200c . . . 200n. The keyboard control of a user interface, and other peripheral equipment such as the monitor or printer, may be available at the manufacturing site or, advantageously, at one or more of the fitter's offices on the network. Linkage to billing or other applications, referring to FIG. 2, may be provided from processor 28. In a preferred embodiment messages 33a, 33b (FIG. 2) are transmitted over line 33 to processor 28 update billing data or lens form inventory data that is stored in the memory 38 at the manufacturing site 208, and indicate, both at the manufacturing site and to users at remote sites, such as shown on FIG. 10, for example, by connection to a remote monitor 35a or a remote printer 37a, when a requested lens is scheduled to be cut, or, similarly, indicate physical lathing constraints.

Figure 11:
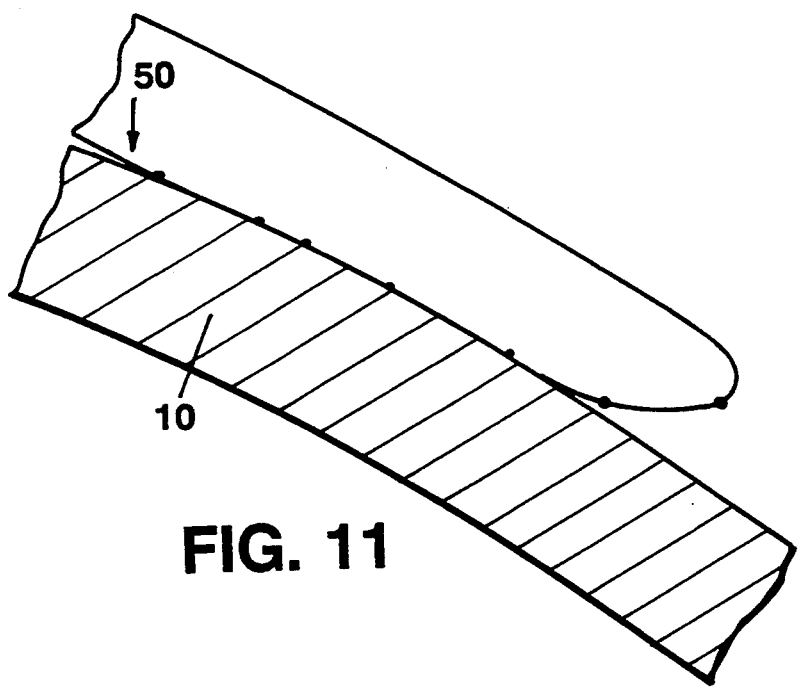
FIG. 11 is a magnified cross-sectional view of a lens periphery having a close relationship to a corneal surface in accordance with the invention.

Additionally, since the spline can be mathematically defined, data representing the lens design and related data can be stored in a permanent data storage device, for example in memory 38 (FIG. 2) connected to processor 28, and a lens having consistent dimensions can be repetitively reproduced on computer controlled lathing equipment 32, or even advantageously altered to reflect new clinical information. Different lens surface shapes may be clinically desirable. For example, referring to FIG. 11, in the embodiment shown, the peripheral profile of the back lens surface substantially matches the curvature of the cornea 10. The design flexibility offered by use of a computer controlled lathe may further be advantageously exploited.

In a preferred embodiment, referring to FIG. 12, a spline is used to define and generate not just the lens peripheral portions 67, 68 but the entire lens posterior surface 65 shown over area 160. While the illustrated embodiment of FIG. 12 shows a single conic section defining the back surface of the lens over the central optical portion 150, it is possible that a series of curves define that central optical portion employing the spline approximation technique detailed above.

In a preferred embodiment, referring to FIG. 12, a spline curve may similarly define the front surface 55 of the lens, generally based upon the first defined back surface 65 and a desired lens thickness. A lens thickness is usually determined by the fitter by considering the how the eye lid may touch or move a lens riding on the corneal surface 145, or for optical or other clinical properties. Providing a desired relationship between front and back surfaces may be advantageous to correct optical aberrations introduced by the back surface of the lens or the eye, to optimize the lens mass, or to provide a lens with optimal fitting characteristics. In a preferred embodiment of the invention, the front and posterior surfaces are each defined by a spline with appropriate boundary conditions to provide a smooth transition therebetween, at the peripheral edge, without any hand polishing. An advantage of this embodiment is that no human polishing or buffing is required to reshape the lens. Yet another advantage is that the transition from front to back lens surface may be defined to improve the supply of tear fluid to the corneal surface spanned by the central optical portion of the lens.

Additionally, the storage of data representing the lens design improves the fitter's ability to clinically assess the patient, and also improves the fitter's ability to project likely outcomes when providing a new design. An enhancement to the procedure would be to have the computer make the determination based on a knowledge based system built into the program.

It is possible to create a computer program that allows the contact lens fitter the ability to import raw topographical corneal data, such as mapping information, to a processor 28 appropriately programmed, for example, with knowledge-based routines, so that the processor itself performs the individual lens design based on that imported raw data, or aids the fitter's decisions, for example, in the placement of knots, to design the lens. It will be appreciated that this advantage is possible even if the fitter is remotely located as shown in FIG. 10.

Attached hereto as an Appendix A to this application is a listing of source code in microfiche form, written in the C language and implementing a particularly preferred embodiment of the invention. Additions, deletions, and other modifications of the invention will be apparent to those practiced in the art and are within the scope of the following claims.

What is claimed

1. A method of manufacturing a contact lens to fit a corneal topology comprising the steps of,
   providing data representing said corneal topology,
   generating from said data a plurality of piecewise polynomials approximating said corneal topology,
   a plurality of adjacent pairs of said piecewise polynomials having equal first and second derivatives where said piecewise polynomials join, and
   a first derivative of said piecewise polynomial adjacent to a central optical portion being equal to the first derivative of a curve approximating said central portion, where said piecewise polynomials join, and
   cutting a contact lens surface corresponding to said plurality of piecewise polynomials.

2. The method of claim 1 further comprising the steps of
   representing each said piecewise polynomial by a third order polynomial equation.

3. The method of claim 1 wherein
   an outermost peripheral section satisfies a not-a-knot condition where it does not join another said piecewise polynomial approximating said corneal topology.

4. The method of claim 1, further comprising the step of,
   approximating said corneal topology in its entirety using said piecewise polynomials.

5. A method of manufacturing a contact lens to fit a corneal topology comprising the steps of,
   providing data representing said corneal topology,
   determining from said data a spline approximating said corneal topology,
   said spline being clamped to a curve approximating a central portion of the corneal topology, and
   cutting a contact lens having a peripheral posterior portion corresponding to said spline.

6. The method of claim 5 further comprising the step of,
   storing data representing said spline, whereby said contact lens corresponding to said spline is reproducible.

7. The method of claim 5 comprising the further steps of,
   displaying said determined spline, and
   providing a user interface so that said displayed spline can be altered in response to a user generated signal indicating a change in said approximation of said corneal topology.

8. The method of claim 4 comprising the further step of,
   calculating a spline which provides a lens of a specific thickness having the desired optical and clinical properties.

9. A contact lens approximating a corneal topology comprising
   a posterior surface constructed and arranged in the form of a plurality of piecewise polynomials joined end to end,
   a plurality of adjacent pairs of said piecewise polynomials having equal first and second derivatives where said piecewise polynomials join, and
   a first derivative of said piecewise polynomial adjacent to a central optical portion being equal to the first derivative of a curve approximating said central portion, where said piecewise polynomial and said optical portion join.

10. The contact lens of claim 9 further comprising
    a front surface adjoining said back surface, and adapted so that the first derivative of the outermost curve defining each surface is equal where said front surface and said back surface join.

11. A system to manufacture contact lens comprising,
    a digital data processing system connected to an input device to receive data relating to a corneal topology,
    said processing system comprising
       means to define a lens surface corresponding to a plurality of piecewise polynomials approximating said corneal topology,
       a plurality of adjacent pairs of said piecewise polynomials having equal first and second derivatives where said piecewise polynomials join, and
       a first derivative of said piecewise polynomial adjacent to a central optical portion being equal to the first derivative of a curve approximating said central portion, where said piecewise polynomials join, and
    a lathe connected to said digital data processing system, for cutting a lens corresponding to said defined lens surface.

12. The system of claim 11 wherein said input device comprises communication means for connecting to and receiving said data from a plurality of remote data generating sources.

* * * * *

UNITED STATES PATENT AND TRADEMARK OFFICE
CERTIFICATE OF CORRECTION

PATENT NO. : 5,452,031

DATED : September 19, 1995

INVENTOR(S) : Christopher A. Ducharme

It is certified that error appears in the above-identified patent and that said Letters Patent is hereby corrected as shown below:

Column 2, line 15, "reproduce ability" should be --reproduceability--.

Column 3, line 14, "reproduce ability" should be --reproduceability--.

Column 4, between lines 7 and 8, insert the following: --FIG. 6 is a reduced and less detailed copy of the graph of FIG. 5.--

Figure 6A:
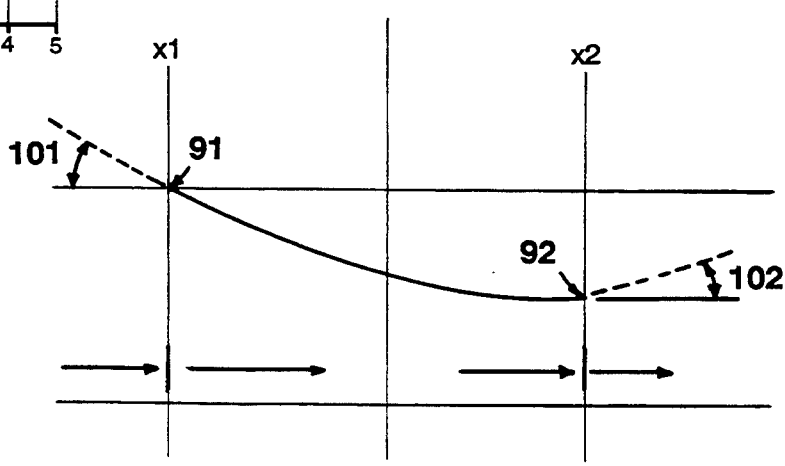

Column 4, line 8, change "Fig. 6" to --Fig. 6a--.

Column 6, line 5, "f1," should be --f1'--.

Column 6, line 7, change "FIG. 6" to --FIGS. 6 and 6a,--.

Column 10, line 17, "4" should be --5--.

Signed and Sealed this

Thirtieth Day of July, 1996

Attest:

BRUCE LEHMAN

*Attesting Officer*     *Commissioner of Patents and Trademarks*